United States Patent [19]

Wurzer

[11] Patent Number: 5,395,190

[45] Date of Patent: Mar. 7, 1995

[54] SHIPPING CONTAINER PEDESTAL

[75] Inventor: Jeffrey D. Wurzer, Pittsburgh, Pa.

[73] Assignee: McConway & Torley Corporation, Pittsburgh, Pa.

[21] Appl. No.: 201,671

[22] Filed: Feb. 25, 1994

[51] Int. Cl.$^6$ .................... B65D 19/00; B61D 17/00; B60P 7/08
[52] U.S. Cl. ........................................ 410/72; 410/71
[58] Field of Search .................... 410/70, 71, 72, 73, 410/82, 83, 84, 90, 91, 44, 52, 54, 68, 76, 74, 75

[56] References Cited

U.S. PATENT DOCUMENTS

| | | | |
|---|---|---|---|
| 3,321,162 | 5/1967 | Connerat | 410/73 |
| 3,547,048 | 12/1970 | Miller | 410/73 |
| 3,556,449 | 1/1971 | Connerat et al. | 410/73 |
| 3,805,709 | 4/1974 | Schuller et al. | 410/73 X |
| 4,131,071 | 12/1978 | Glassmeyer | 410/83 X |
| 5,156,505 | 10/1992 | Mautino | 410/72 |

Primary Examiner—David A. Bucci
Assistant Examiner—James Eller
Attorney, Agent, or Firm—James Ray & Associates

[57] ABSTRACT

Discloses is a castable, pedestal-type support apparatus to support a cargo shipping container on a transportation vehicle in a position to be secured thereto by a particular style locking mechanism. The apparatus includes an elongated body portion with a pivot pin receiving portion and a counterweight portion at one end, and a cargo shipping container engaging apparatus at the other end. The cargo shipping container engaging apparatus includes a three-sided rectangular cavity against a rectangular floor wall portion with a four-sided rectangular opening thereto at the outermost end. Lock engaging apparatus incorporated therewith include a pair of parallel and spaced rib members disposed across said four-sided rectangular opening into said three-sided rectangular cavity, each having an aperture aligned with the axis of a half-circle cut-out portion in the each end of a pair of side wall portions of the rectangular cavity, as well as a pair of lock engaging nipples extending downwardly from the upper and outer corner of the three-sided cavity at an angle approximately 30 degrees from vertical.

20 Claims, 2 Drawing Sheets

SHIPPING CONTAINER PEDESTAL

FIELD OF THE INVENTION

The present invention relates generally to equipment for supporting a cargo shipping container in a predetermined position on a generally flat bottom-types transportation vehicle so that it can be secured thereto with a predetermined style cargo shipping container locking mechanism. More particularly, this invention relates to a pedestal-type support apparatus for use in the above-said application which can be cast as an integral single piece unit.

BACKGROUND OF THE INVENTION

It is well known in the art that during transportation, cargo shipping containers are normally supported on, and connected to, generally flat bottom-type transportation vehicles. Such vehicles include railway-type flat cars, flat-bed trucks as well as other lading-type transportation vehicles such as ocean going vessels. In general, the equipment that has normally been used in this application as supporting members for such shipping containers consist of pedestal supports which are manually adjustable along the length of the deck or flat bed portion of the particular transportation vehicle being used. The manual adjustment required will normally depend upon the overall length of the shipping container to be supported.

It is also well known in the art that such cargo shipping containers can be of various length and shapes. Particularly if the shipping containers are to be secured within ocean-going vessels, they may require a special shape so that a large number of such containers can be easily fitted within the hold of the ship. When carrying such cargo shipping containers on land vehicles, however, only one or two such containers can be carried on a single vehicle. In the case of railway cars, it is common practice to stack such containers two-high per railway car for transportation. In the railway industry, special cars are specifically designed and built for the sole purpose of carrying cargo shipping containers.

In accordance with conventional practice, cargo shipping containers are normally fabricated to be closeable, rectangular containers with a locking mechanism built into flat-bottom under-surface at each corner. The locking mechanism usually comprises a cast block having an opening through the under-surface into which a portion of the support pedestal is insertable and locked in place with a locking mechanism incorporated within the casting. Because the locking mechanism used to secure these shipping containers to such support pedestals are supplied by different manufacturers, any one given type of support pedestal will not normally work with each style of locking mechanism that is presently in commercial use in the transportation industry. In addition, while such support pedestals are normally positioned to support the four corners of the shipping container, there are conditions where additional support will be desired, if not required, such as the need to provide support intermediate the ends as well as the corners. As examples of pedestal-type cargo shipping container locking devices, see U.S. Pat. Nos. 4,430,032, 4,597,701 and 4,844,672.

U.S. Pat. No. 4,430,032 teaches a cargo shipping container retaining apparatus that is specifically designed for a transporting vehicle having a flat deck. This particular retaining apparatus requires that the cargo shipping container have a corner fitting disposed on at least each of the four corner thereof, and positioned in substantially the same horizontal plane. As disclosed in the reference patent, the corner fittings include a slot-like portion designed to receive a latch lever. The latch lever is used for locking the shipping container to the deck of the transportation vehicle. In order to releasably support each corner of the cargo shipping container, a separate support pedestal must be provided, each of which includes a frame member having a base portion, a platform portion spaced above the base portion and end and side wall portions which extend vertically from the platform portion and conform to a corner fitting as the shipping container is lowered onto the platform portion. In this arrangement, at least one of the side wall portions includes a slot-like portion formed therein, extending in a vertical direction along such as least one side wall portion. The latch lever extends along the slot-like portion between parallel walls which form such slot-like portion. The latch lever is provided with a variable pivot, enabling the latch lever to be pivoted between the parallel walls and moved into the slot-like portion to the extent necessary to effect latching engagement with the associated corner fitting on the cargo shipping container. The lower end portion of the latch lever is intended to extend a substantial distance beneath the platform. This particular apparatus also includes a compression spring that engages the lower end portion of the latch lever and biases the latch lever sufficient to cause the corner fitting on the cargo shipping container to engage a strike surface as it is lowered onto the platform. The compression spring includes a movable seat member disposed adjacent the lower end of the latch lever, and a saddle member on the end that is opposite the movable seat member, and positioned for bearing engagement with the lower end portion of the latch lever. The movable seat member includes a leg portion that extends along the compression spring for at least a portion of its length, and a lock bar member engagable with the leg portion and reacts against the movable seat member and an adjacent wall defining a slot. In this manner, compression of the spring is prevented to thereby securely lock the latch lever from being accidentally moved to an undesired release position during transportation.

U.S. Pat. No. 4,597,701, teaches another fastener device for engaging and locking a corner casting of a cargo shipping container to a flat support of a transport vehicle. As taught therein, the corner casting is hollow and includes a planar surface intended to abut and be parallel to the flat support of the transport vehicle. This fastener device includes a hook member which is adapted to penetrate an aperture defined through such planar surface, and a pivot means for coupling the hook member to the flat support on the transport vehicle. The pivot means is positioned for movement parallel to the planar surface relative to the flat support. This arrangement enables movement of the hook member from a first position located outside the corner casting disposed on the cargo shipping container, to a second position of penetration of such corner casting thereby locking a wall of the corner casting between the hook member and the flat support. The pivot means maintains a constant spacial interval from the pivot point to the planar surface during all positions of penetration of the hook member into the aperture. As a result, such moveable pivot means allows the point of engagement of such hook member penetrating into the aperture to be varied in a manner to best match the position and orientation of the aperture without towards and away movement of the pivot point from the planar surface.

U.S. Pat. No. 4,844,672 teaches a wide body-type cargo shipping container that is attached for engagement with a certain wide body shipping container support mechanism disposed on various types of transport vehicles. This is accomplished by the provision of a plurality of adapters that are movably mounted with respect to a supporting point on the bottom portion of the wide body shipping container. Each of the adapters is movable to a position beneath the wide body shipping container supporting point and is engagable therewith in a manner which defines a new supporting structure. Such new supporting structure is spaced laterally inward from the outermost surface of such wide body shipping container so as to permit coupling of such shipping container to a standard width container support mechanism.

SUMMARY OF THE INVENTION

The present invention provides a castable pedestal-type support apparatus useful in supporting cargo shipping containers in a predetermined position on a flat bottom-type transportation vehicle. In addition to supporting the shipping container, such pedestal-type support apparatus enables it to be secured to the transportation vehicle by a predetermined style locking mechanism. Such castable pedestal-type support apparatus comprises an elongated body portion having a predetermined configuration with a predetermined length, a predetermined width and a predetermined depth. A pivot pin receiving portion having a predetermined configuration and predetermined width, is provided at one end of said body portion. The pivot pin receiving portion is provided with a pivot pin receiving circular aperture. Such pivot pin receiving portion and circular aperture are provided for the purpose of pivotally pinning the support apparatus to the flat-bottom surface of a transportation vehicle, so that the support apparatus can be manually pivoted between a position where it can receive, support and lock a shipping container in place, and an inactive position where the support apparatus is pivoted to an "out of the way" position when the transportation vehicle is being used for purposes other than carrying shipping containers. The pivot pin receiving portion extends outwardly from the body portion for a predetermined distance to form an annular bushing surface around the aperture. At the axially opposed end such body portion a box-like member is provided. Such box-like member receives therein at least a portion of such particular style cargo shipping container locking mechanism. The box like member includes three side wall portions which form a three-sided generally rectangular cavity against a generally rectangular floor wall portion, and a support bar member disposed at spaced outer corners of the three side wall portions, to form a four-sided generally rectangular opening into said three-sided, generally rectangular cavity. A pair of parallel, spaced rib members are disposed across the four-sided rectangular opening to the three-sided cavity, each of which is provided with an aperture. These apertures are aligned on a common axis with half-circle cut-out portions in each side wall of the three-sided cavity for purposes of engaging a particular style cargo shipping container locking mechanism. A pair of parallel, partial flange members are disposed within the three-sided cavity, each having a cylindrical, lock engaging nipple extending into said three-sided cavity for purposes of engaging another particular style cargo shipping container locking mechanism. A counterweight is incorporated into the body portion to facilitate manual pivoting of the body portion.

OBJECTS OF THE INVENTION

It is one of the primary objects of the present invention to provide an improved cargo shipping container pedestal-type support apparatus which can be cast as an integral piece units.

Another object of the present invention is to provide an improved cargo shipping container pedestal-type support apparatus which is relatively light weight.

Still another object of this invention is to provide an improved cargo shipping container pedestal-type support apparatus which requires a minimum amount of force to pivot from an inoperative cargo shipping container supporting position to an operative cargo shipping container support position.

A further object of the present invention is to provide an improved cargo shipping container pedestal-style support apparatus which, during the useful life thereof, is essentially maintenance free.

Still another object of the present invention is to provide an improved cargo shipping container pedestal-type support apparatus which requires a minimum amount of machining.

An additional object of the present invention is to provide an improved cargo shipping container pedestal-type support apparatus which is relatively inexpensive to manufacture.

Still another object of the present invention is to provide an improved cargo shipping container pedestal-type support apparatus which is relatively simple to install.

A further object of the present invention is to provide an improved cargo shipping container pedestal-type support apparatus which can be retrofitted to existing flat bottom-type transportation vehicles.

A still further object of the present invention is to provide an improved cargo shipping container pedestal-type support apparatus which does not require any special installation tools.

In addition to the above-described objects and advantages of the improved castable cargo shipping container pedestal-type support apparatus, various other objects and advantages of the present invention will become more readily apparent to those persons who are skilled in the cargo shipping container pedestal-type support art from the following more detailed description of the invention, particularly, when such description is takes in conjunction with the attached drawing figures and with the appended claims. All of the above components are cast as a single pedestal-type support apparatus.

DESCRIPTION OF A PREFERRED EMBODIMENT OF THE INVENTION

Figure 1:
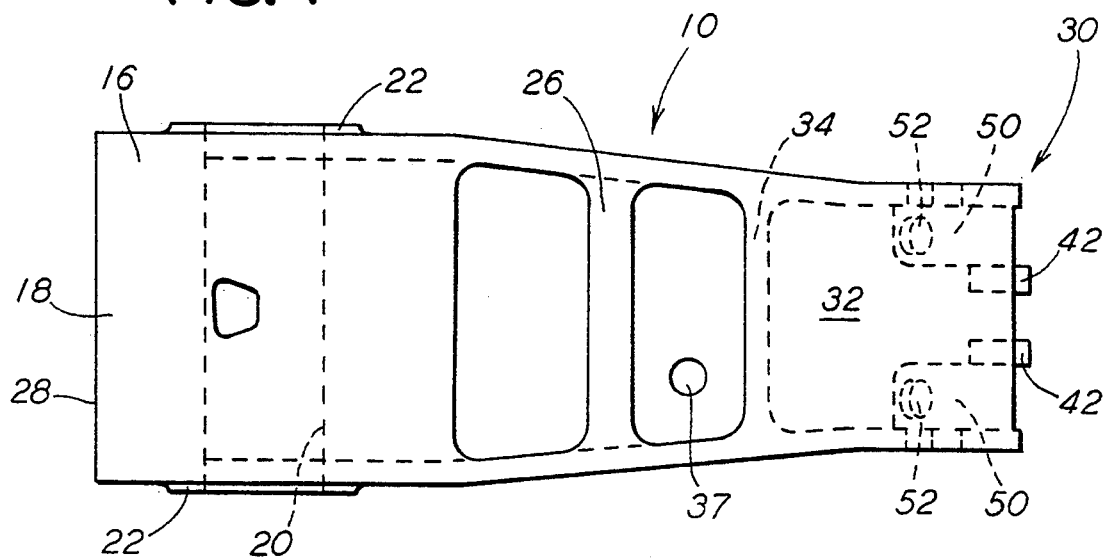
FIG. 1 is a top view of a pedestal-type support apparatus for a cargo shipping container according to a preferred embodiment of this invention.
Figure 2:
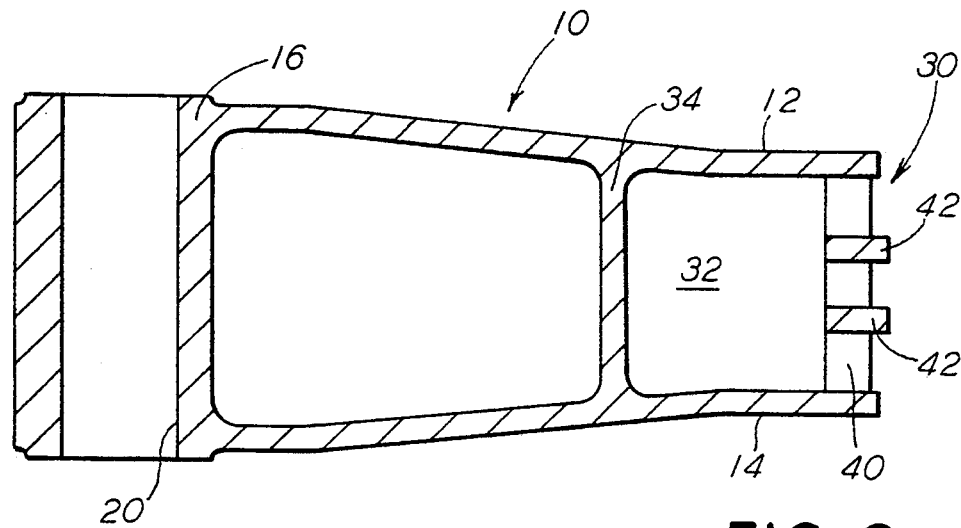
FIG. 2 is a sectional top view of the pedestal-type support apparatus for a cargo shipping container illustrated in FIG. 1 with the section taken at line II—II of FIG. 3.
Figure 5:
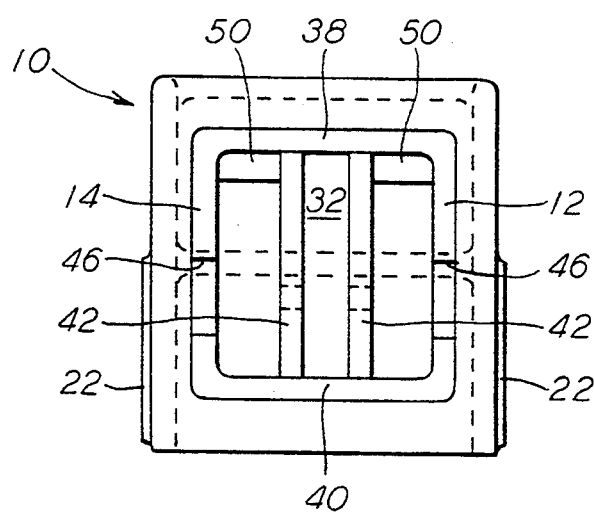
FIG. 5 is a end view of the pedestal-type support apparatus for a cargo shipping container illustrated in FIG. 1–4 as seen from the end for receiving the cargo shipping container.
Figure 3:
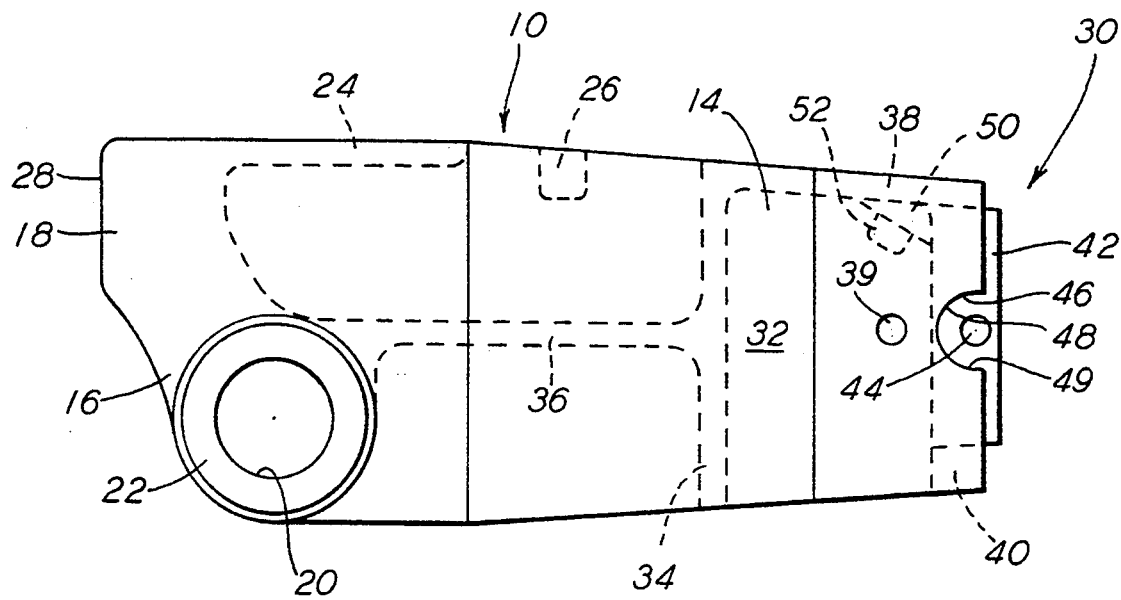
FIG. 3 is an elevational side view of the pedestal-type support apparatus for a cargo shipping container illustrated in FIGS. 1 and 2.
Figure 4:
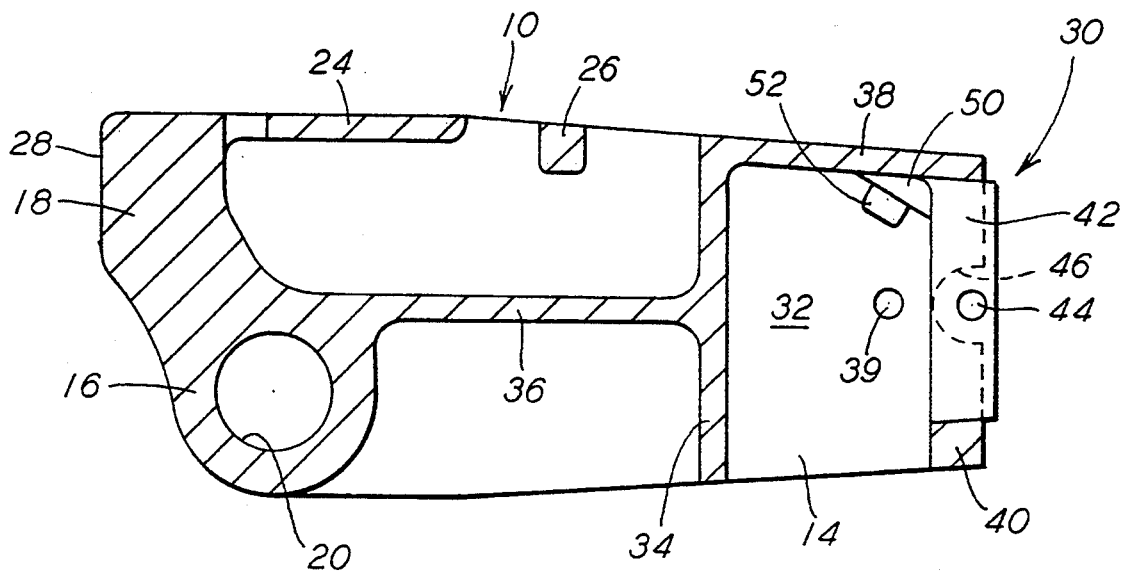
FIG. 4 is a sectional elevational side view of the pedestal-type support apparatus for a cargo shipping container illustrated in FIGS. 1–3 with the section taken at line IV—IV in FIGS. 1 and 2.

Prior to proceeding with a more detailed description of the inventive cargo shipping container pedestal-type support apparatus, it should be noted that throughout the several views illustrated in the attached drawings, identical components which have associated therewith identical functions have been identified with identical reference numerals for the sake of clarity.

Referring now to the several drawings, illustrated therein is a preferred embodiment of a castable pedestal-type support apparatus wherein the support apparatus generally designated 10, is intended for use in supporting a cargo shipping container (not shown) in a predetermined portion of a flat bottom-type transportation vehicle (not shown). Such pedestal-type support apparatus 10 enables such cargo shipping container to be secured to such transportation vehicle by a predetermined style locking mechanism (not shown). This particular support apparatus 10 is designed for use with cargo shipping container having "Portec" locking mechanisms. This castable pedestal-type support apparatus 10 comprises a body member, generally designated 20. The body member 20 includes a pair of substantially identical and spaced side wall portions 12 and 14. Each of such pair of side wall portions 12 and 14 have a predetermined length and a predetermined width and a predetermined thickness.

As in most prior art pedestal-type supports, the pedestal-type support of this invention is designed so that it can be pivoted between two positions; namely, a generally horizontal position so that the support can be pivoted to position its elongated dimension horizontally, parallel to the flat bottom of the transportation vehicle thereby placing the pedestal-type support in an inactive position, and a generally vertical position so that the support can be pivoted to position its elongated dimension vertically so that the lock engaging end is uppermost and in an active position to receive and lock the shipping container in position. Accordingly, at a one end of the support apparatus 10, the side wall portions 12 and 14 are parallel, and joined together by a mass of cast metal that form a pivot pin receiving portion 16 and a counter weight portion 18. The pivot pin receiving portion 16 is provided with a generally cylindrical aperture 20 having a predetermined diameter and adapted to receive a pivot pin (not shown) for purposes of pinning the support apparatus 10 to a pivot anchor (not shown), secured to the flat bottom surface of the transportation vehicle (not shown) so that the support apparatus 10 can be selectively pivoted to either an active vertical position, or an inactive horizontal position. To facilitate the pivotal motion, the outer surfaces of each side wall 12 and 14 projects outwardly for a predetermined distance of between about 0.125 and about 0.141 inch to provide a raised annular bushing surface 22 encircling the aperture 20. To facilitate manual pivotal efforts, an elongated flange 24 extends from counterweight 18, and a transverse brace 26, are each disposed between the side wall members 12 and 14, each of which will provide a handle-like means to permit a single worker to pivot the support apparatus to the position desired. As can further be seen, counterweight 18 is provided with a flat surface 28 perpendicular to the elongated axis of the support apparatus 10, which provides a base upon which the support apparatus 10 rests when pivoted to the active vertical position.

At the opposite end of support apparatus 10, axially opposed from the counterweight 18, the shipping container lock engaging mechanism generally designated 30 is positioned so that it will be oriented on top of support apparatus 10 when pivoted to be vertically oriented. The lock engaging mechanism 30 comprises a partial box-like member 32 for receiving at least a portion of a cargo shipping container locking mechanism therein. The partial box-like member 32 is formed by parallel outer extensions of the two side wall portions 12 and 14 which are generally perpendicular to the axis of pivot pin aperture 20, and a floor wall portion 34 extending transversely between side wall portions 12 and 14 parallel to the axis of the pivot pin aperture 20. The floor wall portion is parallel to and spaced from an outer edge of a respective one of the side wall portions by a distance of about 5.75 inches. As can be seen, floor wall portion 34 is spaced from the ends of side wall portions 12 and 14 sufficient to form the partial box-like member 32. As can further be seen, a supporting, web-like, connecting wall portion 36 is disposed substantially mid-way between each axially opposed outer edge of side wall portion 12 and 14 which abuts against floor wall portion 34. Aperture 37, through supporting wall 36 is provided for drainage purposes.

The partial box-like member 32 is further partially formed by a third side wall portion 38 extending between adjacent edges of the parallel side walls portions 12 and 14, such that two opposed edges of said third side wall portion are contiguous with two opposed edges of the side wall portions 12 and 14, and a third edge thereof is contiguous with an edge of said floor wall portion 34. Accordingly, the box-like member 32 comprises the outer portions of side walls portions 12 and 14, and the third wall portion 38, which form a three-sided, generally rectangular cavity against said floor wall portion 34.

A generally rectangular support bar member 40 measuring approximately one inch square is disposed between the side wall portion 12 and 14 and transversely thereto at the outer corner of each of said side wall portions 12 and 14 opposite the outer edge of said third wall portion 38, so as to form a four-sided generally rectangular opening into said three-sided, generally rectangular cavity. A pair of parallel and spaced rib members 42, are disposed across the rectangular opening, one end of each rib member 42 secured to the support bar member 40, and the other end of each secured to the outer edge of the third side wall member 38. Each rib member 42 is provided an aperture 44 therethrough having a radius of about 0.56 inch, such that the two apertures 44 are aligned on a common axis.

Each wall portion 12 and 14 is also provided with a half-circular cut-out portion 46 formed in an axially opposed relationship through each of said pair of side wall portions 12 and 14. As can be seen, the half-circle cut-out portions 46 have a generally circular portion 48 of a predetermined radius of about 0.75 inch and a notch portion 49 having a width generally equal to the predetermined diameter of the circular portion 48 disposed between said circular portion 48 and the outermost edge of the side wall portions 12 and 14. The axis of the circular portion 48 of the half-circle cut-out portions 46 are common to the axis of the two apertures 44 through spaced rib members 42. Each of said pair of side wall portions 12 and 14 has an aperture 39 extending transversely therethrough having a radius of about 0.69 inch, and having a common axis lying in a plane through a common axis of the half-circle cut-out portions 46 perpendicular to a respective one end of the side wall portions. This plane is spaced about 1.12 inches from a plane passing perpendicularly through outermost edges of the side wall portions and the axis of the pivot pin receiving aperture.

A pair of parallel, partial flange members 50, extend at an angle from the outermost edge of third wall portion 38 between each of the side wall portions 12 and 14 and the next adjacent rib member 42. Each flange members 50 is provided with a cylindrical, lock engaging nipple 52 extending into said three-sided cavity from a position generally between each side wall portion 12 and 14 and a next adjacent rib member 42, at an angle which is approximately 30 degrees towards floor plate 34 from a position that would otherwise extend transversely across the rectangular opening.

According to the presently preferred embodiment of the invention as described in detail above, the preferred predetermined length of the support apparatus 10 is approximately 20.75 inches, and the predetermined width at the annular bushing surfaces 22, is preferably 7.75 inches, while the preferred height transverse to the pivot pin receiving aperture is 8.25 inches. The side wall portions, the floor wall portion and the third wall portion are about 0.5 inch thick. While the box-like member 32 is described as being a generally rectangular cavity, it can be seen that a vertical section therethrough is in fact slightly trapezoidal in form, while a horizontal section is rectangular only adjacent to the outer end adjacent to the rectangular opening. Nipples 52 are preferably 0.62 inch in diameter, 0.37 inch in length, with the axis thereof angled at 30 degrees from vertical in a vertical plane perpendicular to the axis of pivot pin aperture 20.

While a preferred embodiment of the castable pedestal-type support apparatus has been described in detail above, it should be apparent to those persons skilled in the cargo shipping container support and locking art, that various other embodiments, adoptions and modifications could be made without departing from the spirit and scope of the invention, as defined by the appending claims.

I claim:

1. A castable pedestal-type support apparatus for supporting a cargo shipping container in a transportation position on a generally flat bottom-type transportation vehicle in position to be secured thereto by a predetermined locking mechanism, said castable pedestal-type support apparatus comprising:
   (a) an elongated body member having a predetermined configuration, said body member further having each of a predetermined length and a predetermined width;
   (b) a pivot pin receiving portion at a first predetermined end of said body portion;
   (c) a generally cylindrical pivot pin receiving aperture formed through said pivot pin receiving portion along a longitudinal axis thereof;
   (c) a partial box-like member formed at a second predetermined end of said body portion for receiving at least a portion of a cargo shipping container locking mechanism therein, said partial box-like member including;
      (i) a pair of spaced side wall portions generally perpendicular to said predetermined axis of said pivot pin receiving aperture,
      (ii) a half-circular cut-out portion formed in an axially opposed relationship through each of said pair of side wall portions and having a common axis, said half-circular cut-out portions having each of a generally circular portion of a predetermined diameter and a notch portion having a width generally equal to the predetermined diameter of the circular portion disposed between said circular portion and an outer edge of a respective one end of said side wall portions,
      (iii) an aperture extending transversely through each of said pair of side wall portions having a common axis lying in a plane through said common axis of said circular portions of said half-circular cut-out portions perpendicular to said respective one end of said side wall portions,
      (iv) a floor wall portion extending transversely between said side wall portions and parallel to, and spaced from, said respective one end said side wall portions,
      (v) a third side wall portion disposed intermediate a portion of an inner surface said side wall portions adjacent an outer edge, said third wall portion being a top wall when said pedestal-type support apparatus is in an inoperative cargo shipping container supporting position, and a side wall portion when said pedestal-type support apparatus is in an operative cargo shipping container supporting position, such that said outer portions of said parallel side walls and said third wall portion form a three-sided, generally rectangular cavity against said floor wall portion,
      (vi) a support bar member disposed between said generally parallel side wall portion and transversely thereto at an outer corner of each of said side wall portions opposite an outer edge of said third wall portion, sufficient to form a four-sided generally rectangular opening in to said three-sided, generally rectangular cavity,
      (vii) a pair of parallel and spaced rib members one end of each secured to said support bar member, and the other end of each secured to an outer edge of said third wall member, such that said parallel and spaced ribs members are disposed across said four-sided rectangular opening in to said three-sided, generally rectangular cavity,
      (viii) an aperture extending through each of said rib members, said apertures aligned on a common axis, and aligned on a common axis with said half-circle cut-out portions on said side wall portions,
      (ix) a pair of generally parallel, partial flange members, one each adjacent to each of said side wall portions and adjacent to said third wall portion, each of said pair of partial flange members having a cylindrical, lock engaging nipple extending into said three-sided cavity from a position generally between a side wall portion and a next adjacent rib member, at an angle which is about 30 degrees towards said floor wall portion from a position extending perpendicularly across said rectangular opening, and (d) a counterweight means disposed at an axially opposed second end of said body portion for providing a predetermined force that is required to pivot said pedestal-type support apparatus from such inoperative cargo shipping container supporting position into such operative cargo shipping container supporting position on such flat bottom-transportation vehicle.

2. A castable pedestal-type support apparatus according to claim 1 in which at least said body portion, said pivot pin receiving portion, said box-like member, and said counterweight member are cast as an integral single piece unit.

3. A castable pedestal-type support apparatus according to claim 1 in which at least a portion of said generally circular pivot pin receiving aperture is simultaneously cast into said pivot pin receiving portion.

4. A castable pedestal-type support apparatus according to claim 3 in which a final diameter of generally circular pivot pin receiving aperture cast into said pivot pin receiving portion is achieved by machining.

5. A castable pedestal-type support apparatus according to claim 4 in which each end of said pivot pin receiving portion is machined.

6. A castable pedestal-type support apparatus according to claim 1 in which said body portion has an overall width of about 7.75 inches and an overall height of about 8.25 inches.

7. A castable pedestal-type support apparatus according to claim 1 in which outer surfaces of said pivot pin receiving portion project outwardly for a predetermined distance to provide a raised annular bushing surface encircling said pivot pin receiving aperture.

8. A castable pedestal-type support apparatus according to claim 7 in which said outer surfaces project outwardly between about 0.125 and about 0.141 inch.

9. A castable pedestal-type support apparatus according to claim 1 in which said circular portions of said half-circular cut-out portions have a radius of about 0.75 inch.

10. A castable pedestal-type support apparatus according to claim 1 in which said half-circle portions of said half-circle cut-outs have a radius of about 0.75 inch, and said apertures through said spaced rib members have a radius of about 0.56 inch.

11. A castable pedestal-type support apparatus according to claim 1 in which said apertures through said side wall portions have a radius of about 0.69 inch.

12. A castable pedestal-type support apparatus according to claim 1 in which said support bar member is generally rectangular measuring approximately one inch square.

13. A castable pedestal-type support apparatus according to claim 1 in which said plane through said axis of said apertures in said side wall portions and said axis of said half-circle portions of said half-circle cut-out portions perpendicular to said respective one end of said side wall portions is spaced about 1.12 inches from a plane passing perpendicularly through outermost edges of said side wall portions and the axis of said pivot pin receiving aperture.

14. A castable pedestal-type support apparatus according to claim 1 in which said floor wall portion is parallel to and spaced from an outer edge of a respective one of said side wall portions by a distance of about 5.75 inches.

15. A castable pedestal-type support apparatus according to claim 1 in which said side wall portions, said floor wall portion and said third wall portion are about 0.5 inch thick.

16. A castable pedestal-type support apparatus according to claim 1 in which a connecting wall portion is disposed substantially mid-way between each axially opposed outer edge of said side wall portions which abuts against said floor wall portion.

17. A castable pedestal-type support apparatus according to claim 16 in which a drainage aperture is provided through said connecting wall portion.

18. A castable pedestal-type support apparatus according to claim 1 in which said counterweight means is provided with a flat surface perpendicular to one elongated axis of such castable pedestal-type support apparatus to provide a base upon which the such support apparatus will rest when pivoted to an operative cargo shipping container supporting position.

19. A castable pedestal-type support apparatus according to claim 1 in which said counterweight means includes an elongated flange extending therefrom and disposed between said side wall portions which will provide a handle-like means for manually pivoting such castable pedestal-type support apparatus.

20. A castable pedestal-type support apparatus according to claim 1 further including a handle-like means disposed between the side wall portions for pivoting such castable pedestal-type support apparatus.

* * * * *

UNITED STATES PATENT AND TRADEMARK OFFICE
CERTIFICATE OF CORRECTION

PATENT NO. : 5,395,190

DATED : March 7, 1995

INVENTOR(S) : Jeffrey D. Wurzer

It is certified that error appears in the above-indentified patent and that said Letters Patent is hereby corrected as shown below:

Column 2, line 47, delete "," after 1.

Signed and Sealed this

Twenty-third Day of May, 1995

Attest:

BRUCE LEHMAN

*Attesting Officer*     *Commissioner of Patents and Trademarks*